(12) United States Patent
Eslambolchi et al.

(10) Patent No.: US 7,579,962 B1
(45) Date of Patent: Aug. 25, 2009

(54) DUCT MAPPING DEVICE USING SONDE

(75) Inventors: Hossein Eslambolchi, Los Altos Hills, CA (US); John Sinclair Huffman, Conyers, GA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 313 days.

(21) Appl. No.: 11/233,539

(22) Filed: Sep. 23, 2005

Related U.S. Application Data

(60) Provisional application No. 60/681,921, filed on May 17, 2005.

(51) Int. Cl.
*G01V 3/00* (2006.01)
(52) U.S. Cl. .................................................. 340/854.1
(58) Field of Classification Search .............. 73/152.45, 73/152.46; 254/134.3 R, 134.4, 134.5, 134.6, 254/134.7, 134.3 FT; 299/30; 340/853.1–856.4; 342/357.06, 357.17; 175/45
See application file for complete search history.

(56) References Cited

U.S. PATENT DOCUMENTS

| | | | |
|---|---|---|---|
| 4,884,847 A * | 12/1989 | Bessinger et al. | .............. 299/30 |
| 5,205,542 A | 4/1993 | Keeble | |
| 5,736,821 A | 4/1998 | Suyama | |
| 5,807,026 A | 9/1998 | Valette | |
| 5,884,384 A | 3/1999 | Griffioen | |
| 6,019,351 A | 2/2000 | Allen | |
| 6,130,975 A | 10/2000 | Eyres | |
| 6,286,542 B1 | 9/2001 | Morain et al. | |
| 6,301,414 B1 | 10/2001 | Liese et al. | |
| 6,341,188 B1 | 1/2002 | Serrander et al. | |
| 6,427,784 B1 * | 8/2002 | Archambeault et al. | .. 340/853.3 |
| 6,691,734 B2 | 2/2004 | Beals et al. | |
| 6,697,710 B2 | 2/2004 | Wilcox | |
| 6,736,156 B2 | 5/2004 | Beals et al. | |
| 6,820,653 B1 | 11/2004 | Schempf et al. | |
| 6,947,647 B2 | 9/2005 | Beals et al. | |
| 2003/0006071 A1 * | 1/2003 | Stump et al. | .................. 175/61 |
| 2007/0203639 A1 * | 8/2007 | Van Den Broeck | ......... 701/205 |

FOREIGN PATENT DOCUMENTS

EP 534338 A2 * 3/1993

* cited by examiner

*Primary Examiner*—Thomas H Tarcza
*Assistant Examiner*—Fred H Mull

(57) ABSTRACT

A duct mapping tool comprises a sonde for transmitting a locate signal detectable above the ground and locomotion means for providing movement through the underground duct. A user above the ground detects the transmitted location signal using a signal receiver, and maps the location of the underground duct. In one embodiment, a GPS receiver generates location data at locations associated with the received location signal. The GPS generated location data may be used in conjunction with appropriate mapping software to generate street level maps of underground ducts. Locomotion can be provided in a variety of ways, such as a flexible rod attached to the duct mapping tool and operated by a technician, air motors, or electric motors. Movement control signals may be sent to the underground duct mapping tool via a remote device controlled by a technician.

5 Claims, 6 Drawing Sheets

*FIG. 4*   TRUE
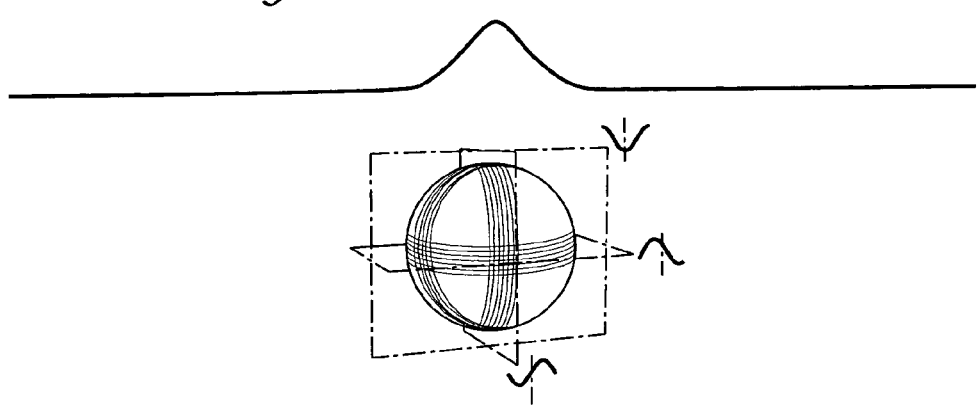
*FIG. 5*
FALSE   TRUE   FALSE
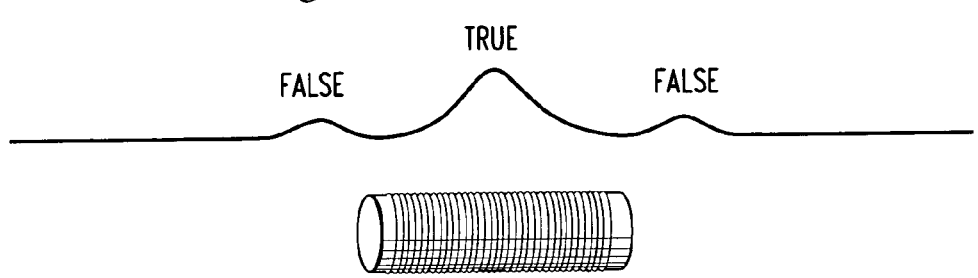

DUCT MAPPING DEVICE USING SONDE

This application claims the benefit of U.S. Provisional Application No. 60/681,921 filed May 17, 2005, which is incorporated herein by reference.

BACKGROUND OF THE INVENTION

The present invention relates generally to locating buried cables, and more particularly to locating buried non-conductive cables.

Recent years have seen a proliferation of telecommunication services. With the additional services has come an increased need for network infrastructure, including in particular, buried cables and associated equipment. Along with this proliferation comes the need to determine the location of buried cables. The location of buried cables is necessary for various purposes, for example to avoid damage during excavation operations, or to repair previously damaged cable.

One known technique for locating buried cable is the application of an electrical signal to a metallic portion of the cable, and using a receiver (usually at the surface) to detect the magnetic fields generated by the applied signal. The applied signal is generally an alternating current (AC) signal. The resultant location signal which is radiated along the length of the cable is detectable by detection equipment. The ability to detect the cable at various distances and depths is dependent upon the type of applied signal, the type of the cable and the ground conditions. Such a technique is well known in the art.

However, a problem presents itself in that telecommunications companies have thousands of miles of non-conductive fiber cable contained in buried duct structures beneath metropolitan streets. This fiber cable is known as "dielectric fiber", meaning it contains no metallic strength members. While dielectric fiber has the advantage of lower cost, it also has the disadvantage that it cannot be located electronically. Since dielectric fiber is non-conductive, the above cable locating techniques cannot be used. While maps may be made during installation of these cables, such maps are often inaccurate and/or outdated.

What is needed is a practical system and method for mapping non-metallic fiber ducts to allow for cable location.

BRIEF SUMMARY OF THE INVENTION

The present invention provides an improved method and apparatus for mapping underground ducts. A duct mapping tool comprises a sonde for transmitting a locate signal detectable above the ground. The duct mapping tool comprises locomotion means for providing movement through the underground duct. A user above the ground detects the transmitted location signal using a signal receiver, and maps the location of the underground duct.

In one embodiment, a GPS receiver generates location data at locations associated with the received location signal. The GPS generated location data may be used in conjunction with appropriate mapping software to generate street level maps of underground ducts.

Various means for providing locomotion are possible. In one embodiment, the duct mapping tool is moved through the duct using a flexible rod attached to the duct mapping tool and operated by a technician. In alternate embodiments, the duct mapping tool's movement is provided by air motors, or electric motors. Movement control signals may be sent to the underground duct mapping tool via a remote device controlled by a technician. These movement control signals may be sent, for example, via RF signals or using a data line connected to the duct mapping tool.

These and other advantages of the invention will be apparent to those of ordinary skill in the art by reference to the following detailed description and the accompanying drawings.

BRIEF DESCRIPTION OF THE DRAWINGS

FIG. 4 shows the above-surface response from a 3 axis sonde;

FIG. 5 shows the above-surface response from a single coil sonde;

DETAILED DESCRIPTION

Figure 1:
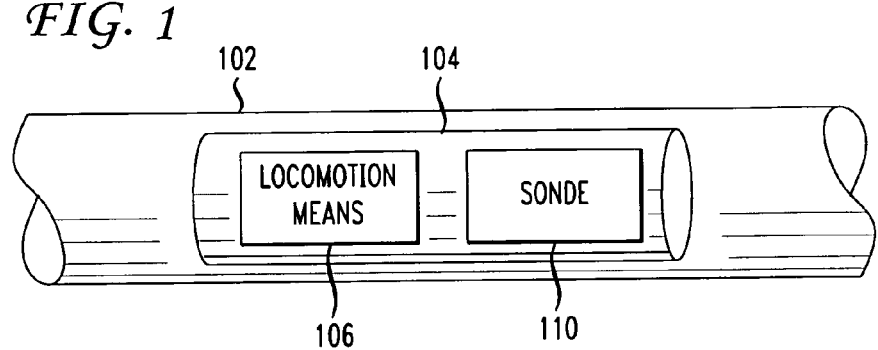
FIG. 1 shows a high level block diagram of a duct mapping device in accordance with an embodiment of the invention.

To address the shortcomings of existing techniques we have invented a duct mapping tool for use in mapping underground ducts. FIG. 1 shows a high level block diagram of a duct mapping device in accordance with an embodiment of the invention. As shown in FIG. 1, duct mapping device 104 is shown within a portion of fiber duct 102. The duct mapping tool 104 contains a sonde 110. Sonde 110 is a radio transmitter which transmits a radio signal which is detectable at a remote location using an appropriate radio receiver. Duct mapping device 104 also contains locomotion means 106 for providing movement through the duct 102.

Figure 2:
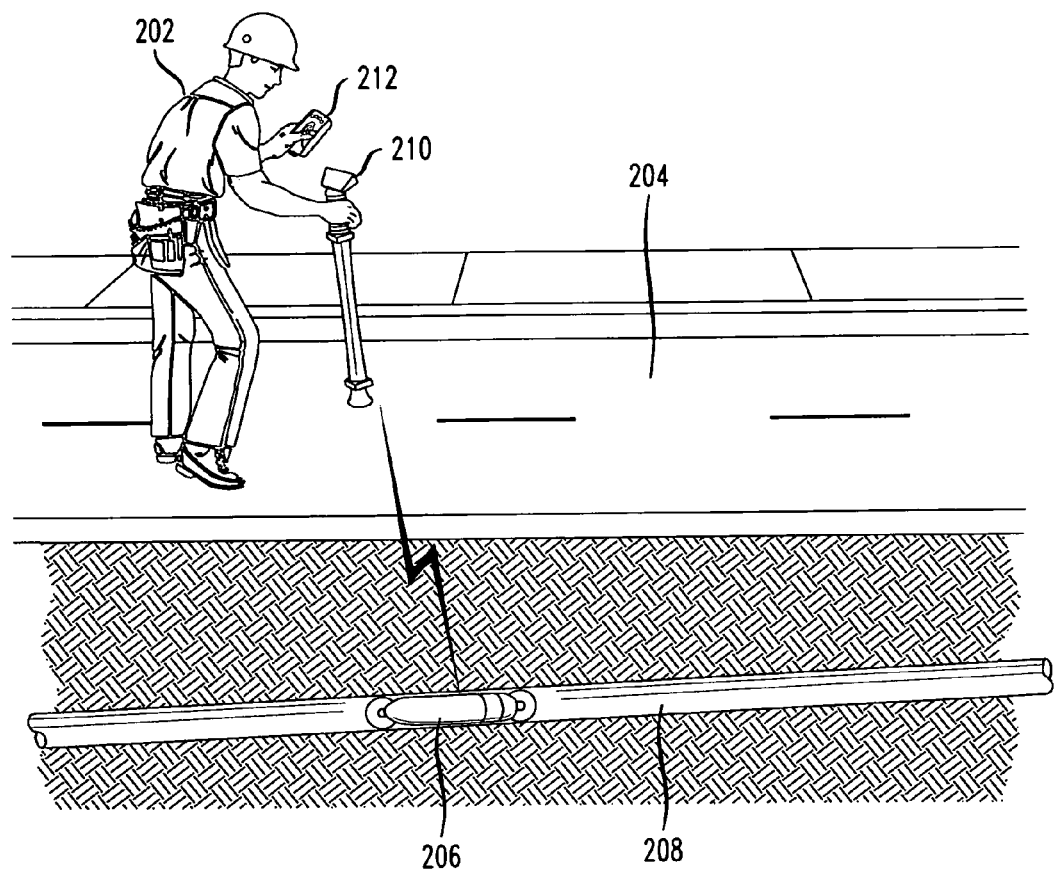
FIG. 2 shows a technician above the surface tracking the underground duct mapping tool.

In operation, the duct mapping tool 104 moves through duct 102 (e.g., underground), propelled by locomotion means 106, which will be described in further detail below. As the duct mapping tool 104 moves through the duct 102, sonde 110 will generate and radiate a signal that can be detected via an appropriate sensor/receiver above ground. As shown in FIG. 2, a technician 202 above the surface 204 can locate the position of the duct mapping tool 206 at various positions and intervals as the tool is moved through the underground duct 208. As will be described in further detail below, the locate technician 202, or another technician, may remotely control the movement of the duct mapping tool 206. The position, direction and depth of the fiber duct is obtained using a well known standard cable locate receiver 210 which receives the signals transmitted by the sonde within the duct mapping tool 206 and generates appropriate locate signals for interpretation by the technician 202. The technician 202 may mark the fiber route above the ground in a well known manner.

The movement of the duct mapping tool 206 through the duct 208 may be accomplished in several ways. First, a flexible (e.g., fiberglass) rod may be attached to the duct mapping tool 206 and a user may manipulate the rod in order to move the duct mapping tool 206 as desired through the duct 208. As the duct mapping tool 206 is moved further into the duct 208, additional length of rod may be fed into the duct by an operator. In an alternate embodiment, the duct mapping tool 206 may contain its own locomotion means (as will be described in further detail below), and the movement of the duct mapping tool may be controlled remotely by sending appropriate control signals to the locomotion means. These control signals may be sent to the duct mapping tool 206 in various ways. For example, in one alternative, the control signals may be sent from a remote device 212 operated by the locate technician 202 (or another technician) via RF signals using well known RF transmission techniques. In an alternate embodiment, a signal line may connect the duct mapping tool to a remote device (e.g., remote device 212, or another remote device), and the movement control signals may be sent from the remote device to the duct mapping tool 206 via the signal line. In operation, as the duct mapping tool 206 is moved further into the duct 208, additional signal line may be fed into the duct from the remove device, in order to maintain data connectivity between the remote device and the duct mapping tool. It is noted here that any line connecting the duct mapping tool to a remote device may be referred to herein generally as an umbilical cord. The umbilical cord may comprise, for example, a compressed air hose, a data line, a retrieval tether cable, or any combination. In one embodiment, the duct mapping tool may move at approximately 1 foot per second.

Figure 3:
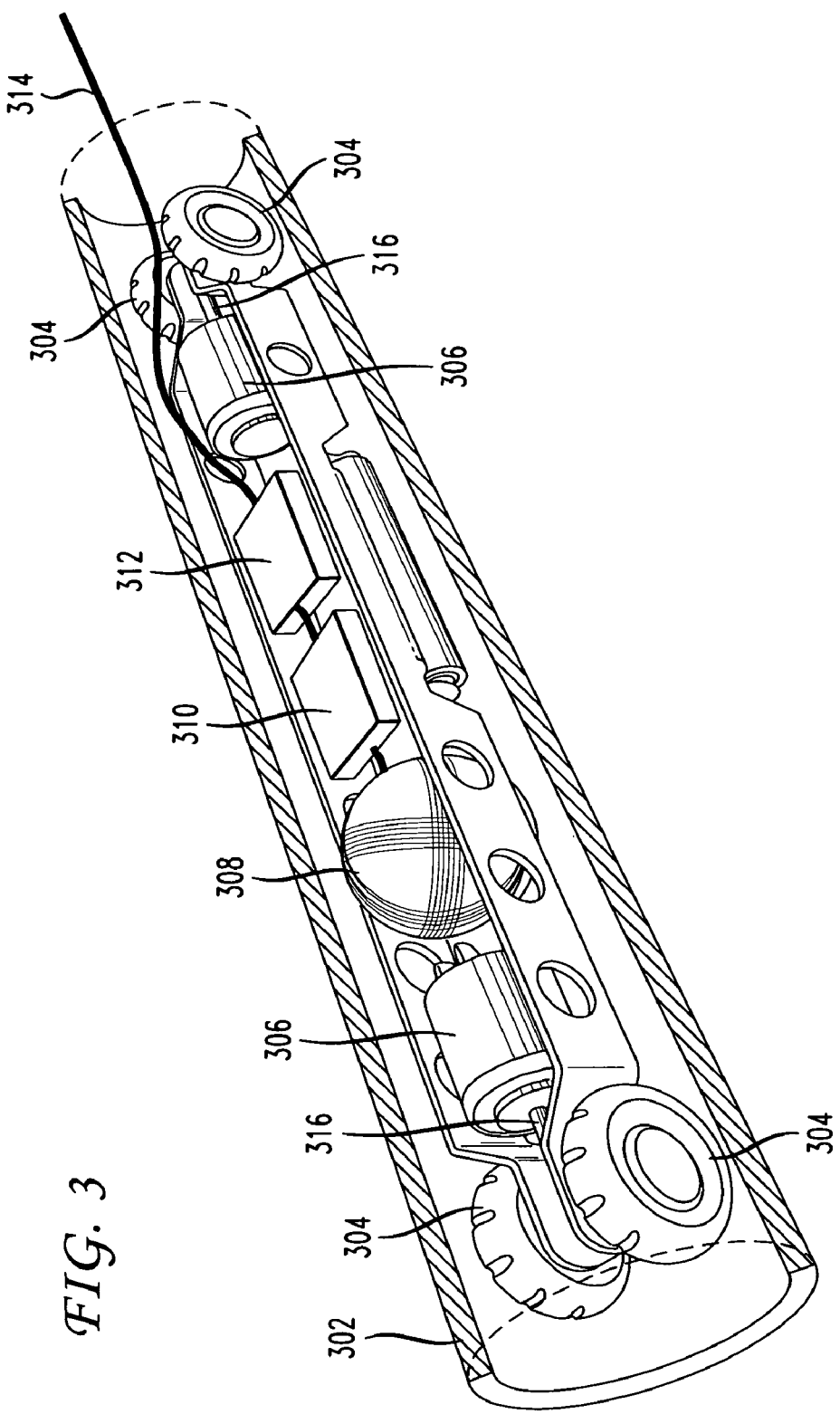
FIG. 3 shows one embodiment of a duct mapping device.

Further details of a particular embodiment of a duct mapping tool in accordance with the principles of the present invention will now be provided in conjunction with FIG. 3. FIG. 3 shows a duct mapping device within a duct 302. Movement is provided by electric motors 306, which are used to drive wheels 304 via drive shafts 316. In an alternative embodiment, movement may be provided by air motors supplied with compressed air via a compressed air tube connected to a compressed air source at the surface. Duct mapping tool contains a sonde 308 as described above. The control of the duct mapping tool is controlled by control circuitry 312, which includes the necessary electronics to control the overall operation of the device. For example, the control circuitry 312 may comprise various well known data processing hardware and software to control the overall operation of the device. Also shown is data line 314, which allows for control signals to be sent to the duct mapping tool from a remote device. Alternatively, the control signals may be sent to the duct mapping tool using RF signals, in which case the data line is not needed for the transmission of control signals. In one embodiment, the duct mapping tool shown in FIG. 3 may be approximately 8 inches in length and 1.25 inches in diameter (appropriate for a 1.5 inch internal duct). Power may be provided via an on-board battery or the umbilical cord.

In one embodiment, the duct mapping device may also include inertial sensors 310 the data from which may be used to supplement the sonde signal. The inertial sensors 310 generate movement data based on the duct mapping tool's movement. Inertial sensors are well known in the art for generating movement data based upon movement of some device. In one embodiment, the inertial sensors 310 may comprise one or more gyroscopes, accelerometers and odometers. Further details of an embodiment utilizing inertial sensors is described in U.S. patent application Ser. No. 11/233,877, filed Sep. 23, 2005, entitled "Duct Mapping Device Using Inertial Sensors", which is incorporated herein by reference.

It is noted that in the event that there is an existing fiber within the duct 302, the movement of the duct mapping tool through the duct may be facilitated by the use of a duct guide tool, as described in detail in U.S. patent application Ser. No. 11/233,878, filed Sep. 23, 2005, entitled, "Duct Rod Guide Tool", which is incorporated herein by reference.

FIGS. 4 and 5 show the above-surface response from two types of sonde transmitter antenna configurations. A 3 axis sonde (FIG. 4) eliminates the false lobes associated with the single coil transmitter (FIG. 5), thus providing for improved location techniques.

Figure 6:
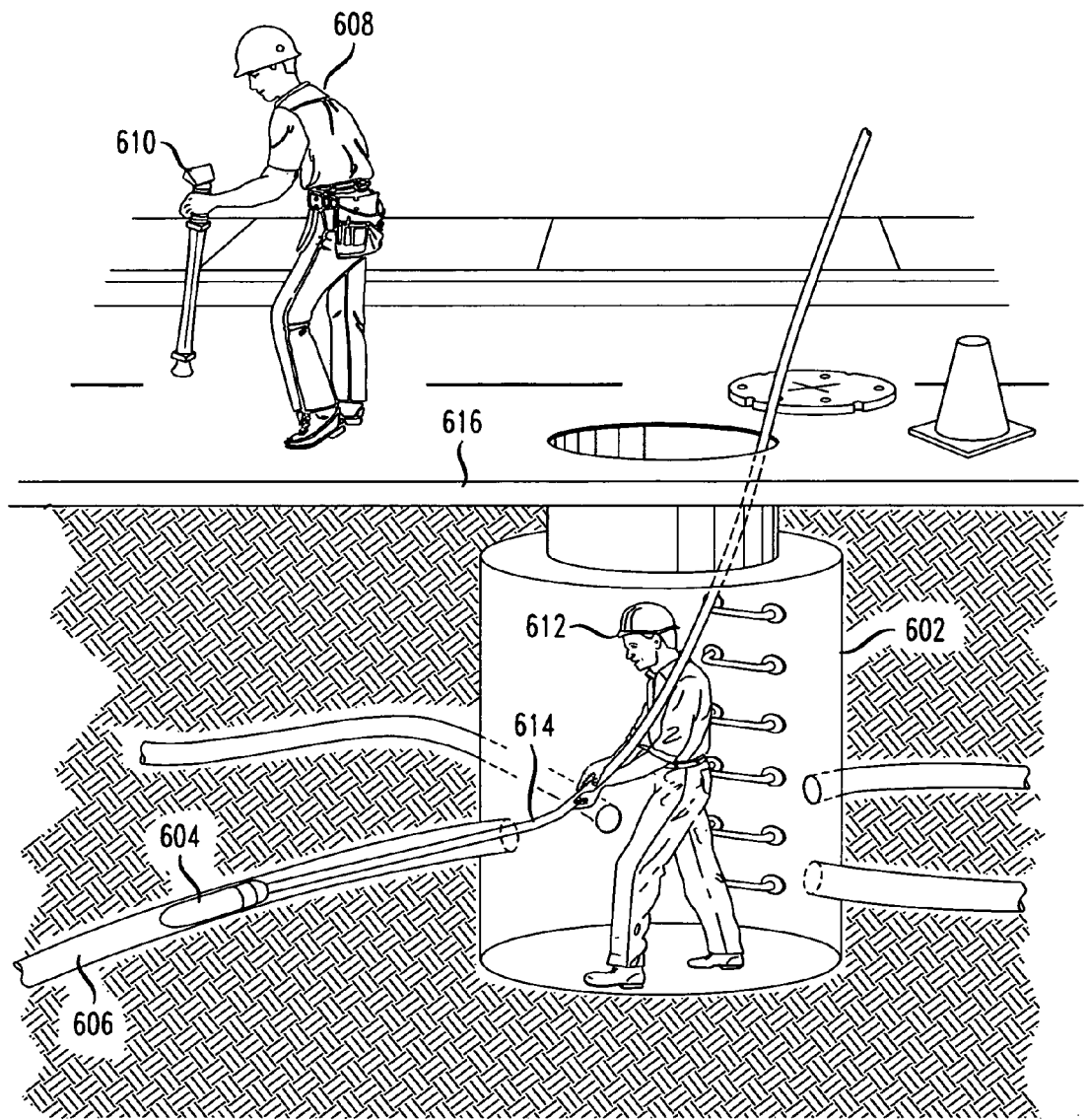
FIG. 6 illustrates a duct mapping tool in use in a typical installation.

FIG. 6 illustrates a duct mapping tool in use in a typical installation. FIG. 6 shows a typical city manhole 602 with ducts leaving in various directions. A duct mapping system in accordance with an embodiment of the invention includes duct mapping tool 604 which is shown inserted into duct 606 so that duct 606 may be mapped by a technician 608 above the ground 616 using a signal detector 610 that detects the signal transmitted from the sonde within the duct mapping tool 604. Movement of duct mapping tool 604 is controlled by a user 612 using a flexible rod 614 (e.g. fiberglass rod) connected to duct mapping device 604. As the duct mapping tool 604 is moved through the duct 606, the locate technician 608 above the ground 616 may track the duct mapping device 604 using signal detector 610. The location of duct 606 may then be mapped.

Figure 7:
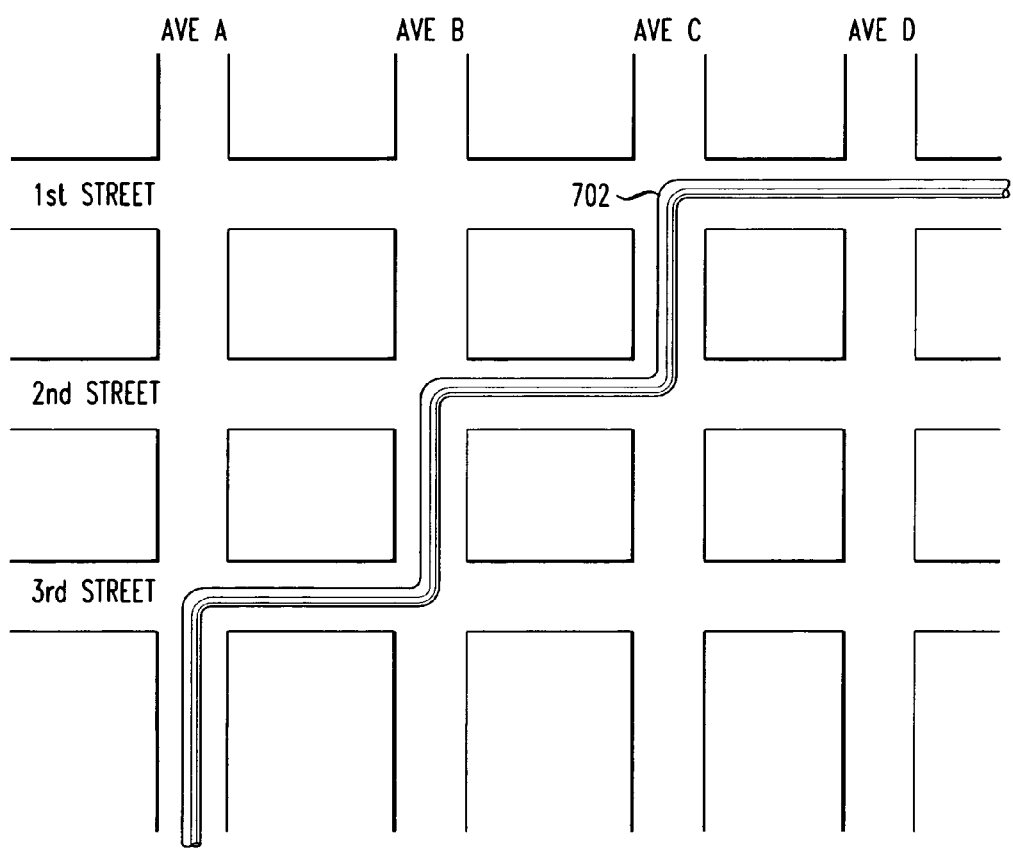
FIG. 7 shows an example of a map of a duct relative to surface streets.

In one embodiment, device 610 may also contain a GPS receiver for determining the geographic coordinates of the device 610 during the tracking session. The device 610 may also comprises street level mapping software for generating a map of the duct relative to the surface streets based on the determined GPS coordinates. An example of such a map is shown in FIG. 7, which shows a graphical representation of the duct route 702 superimposed on a street level map. Such a map could be generated using the GPS generated coordinate data, a street database, and appropriate mapping software which is well known in the art.

Figure 8:
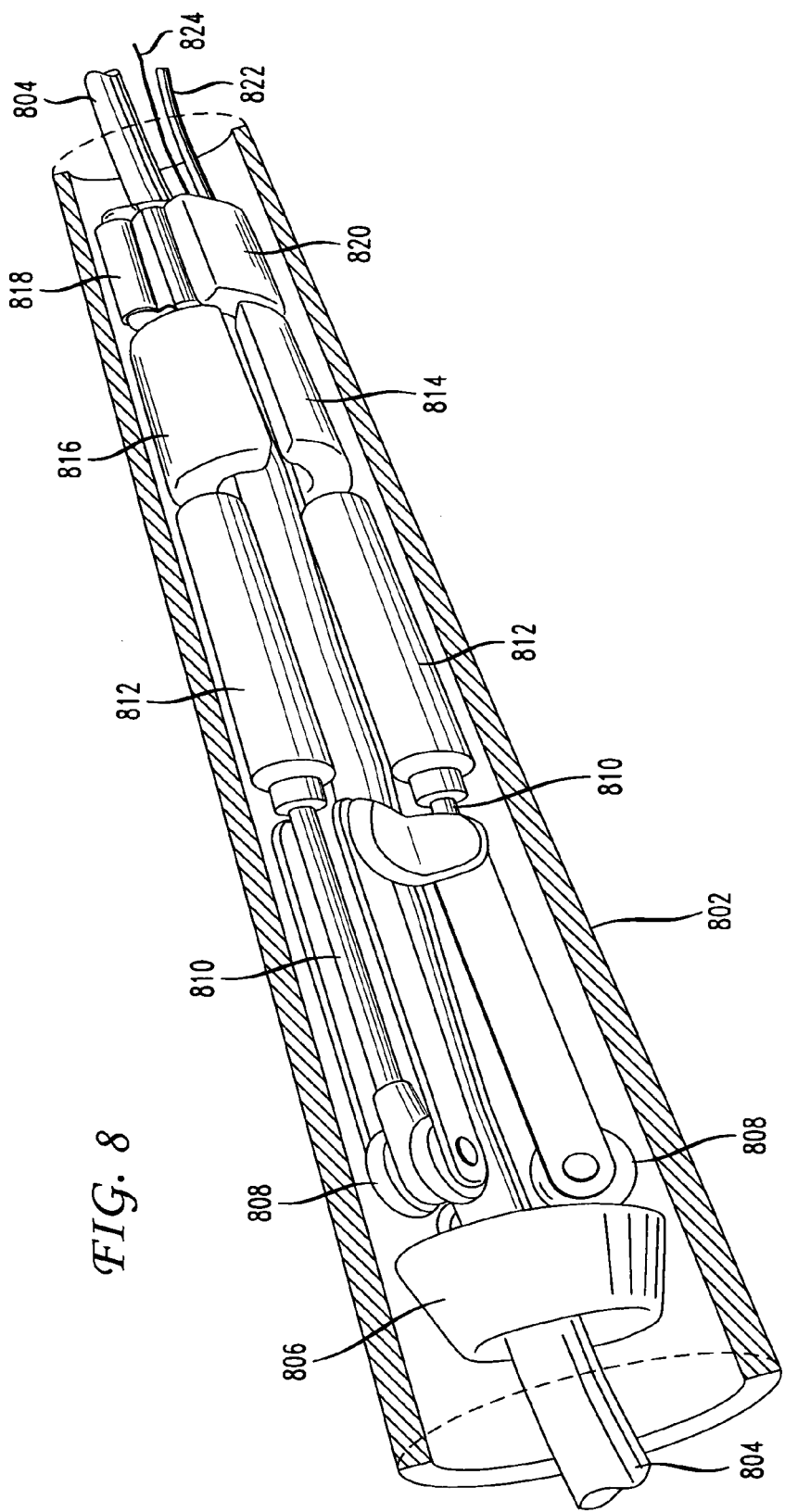
FIG. 8 shows one embodiment of a duct mapping device.

An alternate embodiment of a duct mapping tool is shown in FIG. 8. As shown, the duct mapping tool includes a guide collar 806 through which one or more fiber optic cables 804 pass, which assists in guiding the tool through the duct 802. In one embodiment, the duct mapping device is split, with a latching system, to allow the fiber optic cable 804 to be placed within the guide collar 806. In the embodiment shown in FIG. 8, the locomotion means is provided by air motors 812, which are used to drive wheels 808 via drive shafts 810. The compressed air needed to power the air motors 812 is provided from a remote air compressor at the surface via compressed air hose 822. In an alternative embodiment, the locomotion means may be provided by electric motors. The sonde is shown as 818. Optional inertial sensors in the embodiment of FIG. 8 include accelerometer 816 and one or more gyroscopes 814. The control of the duct mapping tool is controlled by control circuitry 820, which includes the necessary electronics to control the overall operation of the tool. Also shown is data line 824, which allow for control signals to be sent to the duct mapping tool from a remote device, and also allows for the movement data generated by the inertial sensors to be transmitted to the remote device. In one embodiment, the duct mapping tool shown in FIG. 8 may be approximately 8 inches in length and 1.25 inches in diameter (appropriate for a 1.5 inch internal duct). Again, power may be provided via an on-board battery or the umbilical cord.

Further details of a duct mapping tool which utilizes inertial sensors is described in the above referenced U.S. patent application Ser. No. 11/233,877, filed Sep. 23, 2005, entitled "Duct Mapping Device Using Inertial Sensors".

One skilled in the art will recognize that FIGS. 3 and 8 describe two particular embodiments of a duct mapping tool in accordance with the principles of the invention. However, many other configurations of duct mapping tools in accordance with the principles of the present invention could be implemented by one skilled in the art given the disclosure herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for duct mapping comprising the steps of:
   inserting a duct mapping device in an underground duct;
   guiding said duct mapping device through said duct via at least one cable passing through a guide collar attached to said duct mapping device;
   controlling the movement of said duct mapping device using at least one air motor connected to a remote source of compressed air and drive wheels connected to said air motor;
   detecting, above the ground, a signal transmitted by said duct mapping device;
   generating location data using a GPS receiver; and
   generating a map of said duct based on said location data.

2. A duct mapping system comprising:
   a duct mapping tool for insertion and movement within an underground duct, said duct mapping tool comprising a sonde for transmitting a signal detectable above the ground, an air motor connected to a remote source of compressed air, drive wheels connected to said air motor, and a guide collar for guiding said device through said duct via at least one cable passing through said guide collar; and
   a remote signal receiver for detecting said signal above the ground.

3. The duct mapping system of claim 2 further comprising:
   a remote unit for transmitting movement control signals to said duct mapping tool.

4. The duct mapping system of claim 3 wherein:
   said remote unit comprises said remote source of compressed air, said system further comprising a connection between said remote unit and said duct mapping tool for providing said compressed air from said remote source of compressed air to said air motor.

5. The duct mapping system of claim 2 further comprising:
   a GPS receiver for generating location data; and
   means for generating a map of said duct using said location data.

* * * * *